United States Patent Office 2,726,231
Patented Dec. 6, 1955

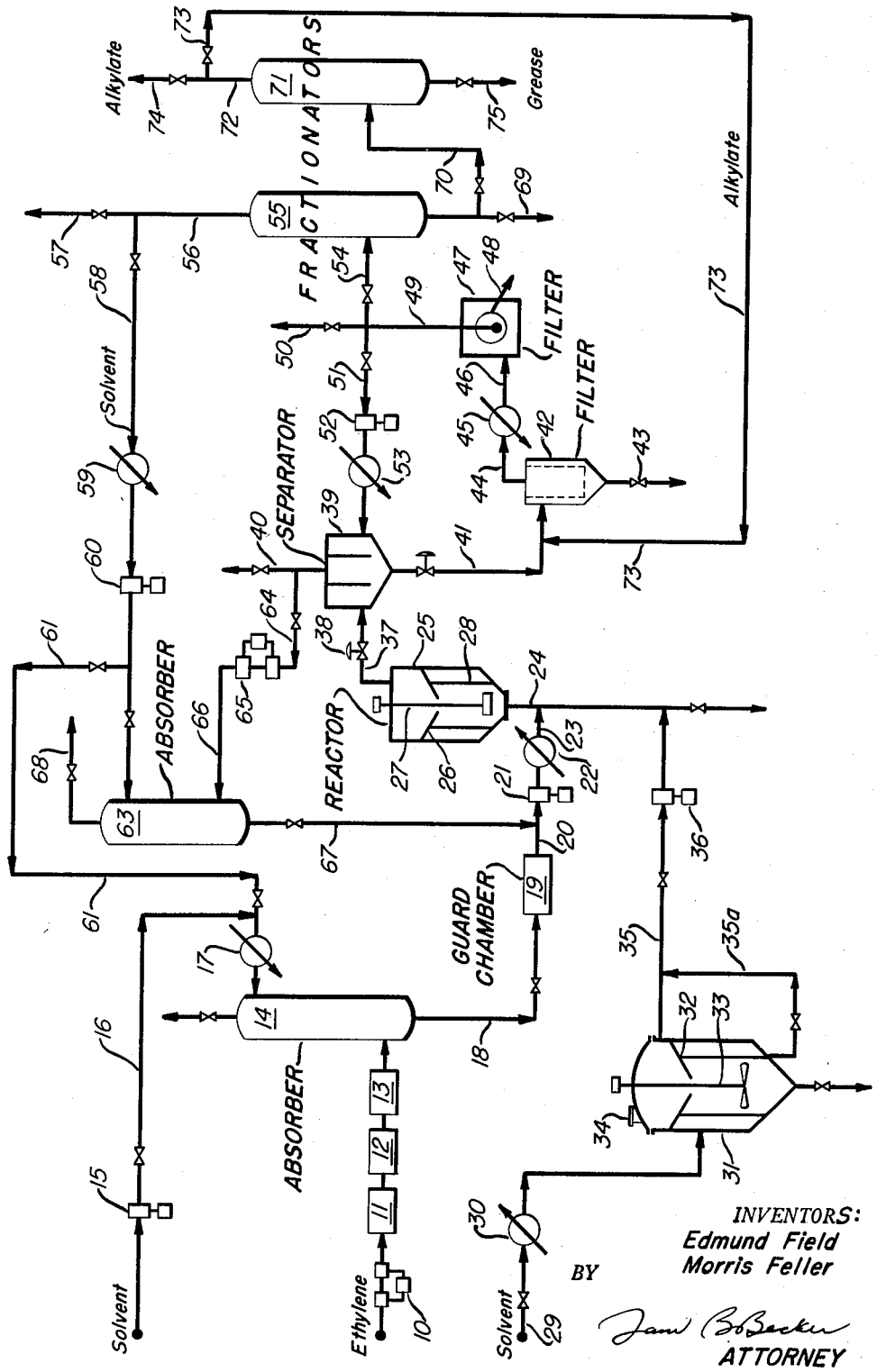

2,726,231

PREPARATION OF SOLID POLYMERS FROM ETHYLENE AND THE LIKE IN THE PRESENCE OF ALKALI METAL HYDRIDES AND GROUP 6A METAL OXIDE CATALYSTS

Edmund Field and Morris Feller, Chicago, Ill., assignors to Standard Oil Company, Chicago, Ill., a corporation of Indiana Application December 6, 1952, Serial No. 324,609

23 Claims. (Cl. 260—88.1)

This invention relates to a novel polymerization process and to novel polymerization products produced thereby. In a more specific aspect, this invention relates to a novel process for the polymerization of ethylene, propylene or their mixtures in the presence of an alkali metal hydride and a solid catalytic material containing an oxide of a metal of group 6a (left hand subgroup of group 6) of the Mendeleef Periodic Table, viz., one or more of the oxides of Cr, Mo, W or U.

One object of our invention is to provide novel and highly useful catalysts for the preparation of high molecular weight polymers from ethylene-containing gas mixtures. Another object is to provide a process of ethylene polymerization in which the yields of solid polymer are greatly increased, as compared with the yields heretofore obtainable solely by the use of subhexavalent molybdena catalysts and similar catalysts. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous mono-olefin such as propylene, to provide novel resinous materials. Yet another object of our invention is to provide a process for the preparation of solid, elastic polymers from propylene. These and other objects of our invention will become apparent from the ensuing description thereof.

Briefly, the inventive process comprises the conversion of ethylene, propylene or their mixtures principally to high molecular weight normally solid, resinous polymers by contact with a group 6a metal oxide, preferably supported on a difficultly reducible metal oxide, and one or more of the hydrides of Li, Na, K, Rb and Cs. The inventive process is effected at temperatures between about 75° C. and about 325° C., preferably between about 130° C. and 260° C., and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. For the polymerization of propylene, less readily alkylatable reaction media such as cycloparaffins, e. g., cyclohexane or decalin, or paraffins, e. g., isooctane, are preferred. The conversion of ethylene or propylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to ethylene polymers, propylene polymers and ethylene-propylene copolymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough, resinous ethylene homopolymers having an approximate specific viscosity ($\times 10^5$) of 10,000 to more than 300,000 [($\eta$ relative $-1$)$\times 10^5$]. By the term "tough, resinous polyethylene," we mean a polymer having a brittle point below $-50$ C. (A. S. T. M. Method D746—51T), impact strength greater than two foot pounds per inch of notch (A. S. T. M. Method D256—47T—Izod machine) and minimum elongation at room temperature (25° C.) of 100%.

The process of the present invention can be employed to effect the copolymerization of ethylene with other polymerizable materials and particularly with propylene. Propylene alone has been polymerized, by the employment of catalysts of the present invention, to rubber-like polymers, in addition to oils and grease-like solids. Other polymerizable materials include mono-olefinic hydrocarbons such as n-butylenes, isobutylene, t-butylethylene, and the like, usually in proportions between about 1 and about 25% by weight, based on the weight of ethylene.

The alkali metal hydrides can be prepared by the interaction of hydrogen with the pure metals and by other methods. It will be understood that the specific preparative methods involved form no part of our invention and that any method which yields the alkali metal hydrides can be employed. Usually the hydrides employed according to the present invention are prepared outside the reactor, but they may be prepared in situ and polymerization can then be effected in the reactor.

The employment of the alkali metal hydrides in the reaction zone has numerous important practical consequences, as compared to processes wherein group 6a metal oxide catalysts are employed without said hydrides. Thus, in the presence of both the said hydride and group 6a metal oxide catalyst, high yields of solid polymers can be obtained from ethylene, metal oxide-containing catalyst can function in the presence of large proportions of liquid reaction medium, the metal oxide-containing catalyst retains strong polymerization activity for a long period of time (long catalyst life), polymers having desirable ranges of physical and chemical properties can be readily produced by controlling the reaction variables, etc., as will appear from the detailed description and operating examples which follow.

The function or functions of the metal hydride in our process are not well understood. The alkali metal hydrides are not per se catalysts for the polymerization of ethylene or propylene to yield high molecular weight, normally solid polymers under the conditions described herein. Yet, these metal hydrides cofunction somehow with the group 6a metal oxide catalysts to increase the productivity (polymer yield) of said catalyst, sometimes prodigiously. It might be assumed that the metal hydrides function merely to react with catalyst poisons which might be present in small proportions of the order of a few parts per million in ethylene, propylene and/or in the liquid reaction medium; we have found, however, that even extremely pure ethylene or propylene and liquid reaction medium which have been contacted with alkali metal or said metal hydrides under reaction conditions and directly thereafter contacted in a separate zone with the molybdenum oxide catalysts, do not produce solid polymer in the high yields or quality which can be attained by the process of the present invention.

The claimed metal hydrides so activate molybdena catalysts that solid polyethylene can be obtained by contacting ethylene with $MoO_3$ alone (preferably partially pre-reduced) i. e., without a support which functions greatly to increase the surface area upon which $MoO_3$ is extended.

Ethylene can be converted to normally solid polymers by contacting it with an alkali metal hydride and a group 6a metal trioxide catalyst, provided the temperature is sufficiently high for the hydride to convert said trioxide, at least in part, to a lower oxide. We prefer to employ a partially pre-reduced group 6a metal trioxide supported on a difficultly reducible metal oxide such as gamma-alumina in our process. Prior to our invention, subhexavalent molybdenum oxides were known to be catalysts for the polymerization of ethylene to form normally-solid polymers only when supported upon the three difficultly reducible metal oxides: gamma-alumina, titania, zirconia. For the polymerization of ethylene and/or propylene to form normally solid polymers in the presence of the claimed metal hydrides, the group 6a metal oxide catalysts may be employed not only on alumina, titania or zirconia, but also on other supports, e. g., silica gel, kieselguhr, diatomite; silicia-alumina, aluminosilicates, such as various clays and bleaching earths; and even adsorptive carbon, which is however not preferred. In a practical process, it is preferable to furnish a difficultly reducible metal oxide support for the group 6a metal oxide catalyst, e. g. gamma-alumina.

The proportion of metal hydride employed in our process can be varied from about 0.001 to about 2 parts by weight per part by weight of group 6a metal oxide catalyst (total weight of solid catalyst), usually between about 0.01 and about 0.25 part by weight. The optimum proportions can readily be determined in specific instances, by simple small-scale tests with the specific feed stocks, liquid reaction medium, reaction medium: catalyst ratio, catalyst, temperature, pressure and nature of the product which is desired. Usually NaH is employed in proportions between about 0.01 and about 0.25 part by weight per part by weight of molybdena catalyst at ratios between about 5 and about 3000 volumes of liquid reaction medium per part by weight of molybdena catalyst.

The relative proportions of support to the catalytic metal oxide may be varied throughout a relatively wide range such that each component is present in amounts of at least approximately 1 weight percent. The usual metal oxide support ratios are in the range of about 1:20 to 1:1, or approximately 1:10. We may employ conditioned alumina-metal oxide catalysts composed of gamma-alumina base containing 1 to 80%, preferably about 5 to 35%, or approximately 10%, of catalytic metal oxide supported thereon.

Gamma-alumina, titania and zirconia supports for our catalysts may be prepared in any known manner and the oxides of molybdenum or other group 6a metal may likewise be incorporated in, or deposited on, the base in any known manner, e. g. as described in copending Serial No. 223,641 of Alex Zletz (now U. S. Patent 2,692,257) and Serial No. 223,643 of Alan K. Roebuck and Alex Zletz (now U. S. Patent 2,692,258), both filed on April 28, 1951. Excellent results have been obtained with metal oxide catalysts of the type conventionally employed for effecting commercial hydroforming, the word "hydroforming" being employed to mean processes of the type described in United States Letters Patent 2,320,147, 2,388,536, 2,357,332, etc.

The molybdena or other molybdenum-oxygen compound, such as cobalt molybdate, may be incorporated in the catalyst base in any known manner, e. g. by impregnation, coprecipitation, co-gelling, and/or absorption, and the catalyst base and/or finished catalyst may be heat stabilized in the known manners heretofore employed in the preparation of hydroforming or hydrofining catalysts. Cobalt molybdate catalysts may be prepared as described in U. S. 2,393,288, 2,486,361, etc. Cobalt, calcium, nickel and copper salts of chromic, molybdic, tungstic and uranic acids may also be employed, with or without a support and are preferably treated with hydrogen under conditions to effect partial reduction before use in our process.

The catalyst may be stabilized with silica (U. S. 2,437,532–3) or with aluminum ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531–2). Oxides of other metals such as magnesium, nickel, zinc, chromium, vanadium, thorium, iron, etc., may be present in minor amounts, below 10 weight percent of the total catalyst.

Although, as stated above, no reducing treatment need be effected on the metal oxide catalysts when they are employed in the presence of alkali metal hydride, a reducing or conditioning treatment is preferred in commercial processing. The conditioning or reducing treatment of the hexavalent group 6a metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p. s. i. g., or even more. The simplest reducing operation may be effected with hydrogen simply at about atmospheric pressure.

The partial reduction of the metal oxide catalyst in which the metal is present in its hexavalent state can be effected in the presence of the claimed metal hydride promoter, prior to contacting the combination of catalysts with ethylene. We have at times observed that an induction period before ethylene polymerization can be eliminated or substantially reduced by pressuring hydrogen into the reactor containing the solvent, ethylene, metal oxide catalyst and metal hydride promoter, e. g. at hydrogen pressures between about 10 and about 900 p. s. i. g., preferably about 100 to 400 p. s. i. g.; under these conditions only a small proportion of the ethylene is reduced to ethane.

Lithium aluminum hydride, an exceptionally active reducing agent, conditions and activates catalysts containing hexavalent group 6a metal oxides even at temperatures as low as 35° C., although in general temperatures between about 100 and about 300° C. can be employed. In practice, a catalyst containing free or chemically combined group 6a metal trioxide is treated with a suspension of $LiAlH_4$ in a liquid hydrocarbon solvent at weight ratios of about 0.01 to about 1 $LiAlH_4$ to solid catalyst. Sodium hydride (or sodium plus $H_2$) is effective in reducing and conditioning hexavalent molybdenum trioxide or other group 6a trioxide catalysts at temperatures above about 180° C. and may be employed in the same proportions as $LiAlH_4$. Calcium hydride effects some reduction of $MoO_3$ supported on gamma-alumina at temperatures of 265° C. and higher.

The conditioning and reducing treatment of the group 6a metal oxide can be followed and controlled by analysis with ceric sulfate-sulfuric acid solution, by means of which the average valence state of the molybdenum or other metal oxide in the catalyst can be accurately determined. In determining the average valence state of metals such as molybdenum in catalysts such as partially reduced $MoO_3$ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists in weighing out approximately one gram of finely-ground, freshly-reduced catalyst into a glass-stoppered 250-ml. Erlenmeyer flask and adding 25 ml. of 0.1 N ceric sulfate solution and 25 ml. of 1:1 sulfuric acid. This mixture is allowed to stand at room temperature for four days with frequent agitation. This interval was arbitrarily chosen initially but was later shown to be more than sufficient time for the oxidation to take place. The solid residue is then filtered off and the excess ceric solution determined by addition of excess standard ferrous solution which is in turn titrated with standard ceric solution using ferrous-orthophenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standard ceric sulfate solution. From the values obtained, the oxidation state of molybdenum can be determined.

The partial reduction of the molybdena or other group 6a metal trioxide is carried out to the extent that the average valence state of the catalytic metal in the catalyst lies within the range of about 2 to about 5.5, preferably between about 3 and about 5.

The conditioning treatment hereinabove described is desirable not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salts, or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 75 and about 325° C. Usually polymerization is effected in the present process at temperatures between about 110 and about 275° C. or the preferred narrower range of about 220 to about 260° C. The conjoint use of polymerization temperatures between about 230 and about 260° C. and a liquid hydrocarbon reaction medium such as benzene, xylenes, decalin, or methyl decalins is highly desirable in producing ethylene polymers having specific viscosities ($\times 10^5$) ranging on the average from about 10,000 to about 30,000 in continuous operations with relatively long on-stream periods and active catalysts.

It has been found that the present process can be employed for the production of relatively high molecular weight ethylene or propylene hetero- and homo-polymers at relatively low pressures. The process of the present invention can be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5,000 p. s. i. g., preferably between about 500 and about 1,500 p. s. i. g., e. g. about 1,000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes, or tetralin, or a cycloaliphatic hydrocarbon, such as decalin (decahydronaphthalene). The amount of ethylene or propylene in such solution may be in the range of about 2 to 50% by weight, preferably about 2 to about 10 weight percent or, for example, about 5 to 10 weight percent. We have observed that when the ethylene concentration in the liquid reaction medium is decreased below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers is preferably not such as to yield said polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between one-half and about 10 hours, usually between about 1 and about 4 hours, are employed and the reaction autoclave is charged with ethylene as the pressure falls as a result of the olefin conversion reaction.

The solvent:catalyst weight ratio can be varied in the range of about 5 to about 3000 or even higher in the case of a flow system. The employment of high solvent:catalyst ratios, which is rendered possible by the presence of one or more of the alkali metal hydrides in the reaction zone, is very important in obtaining high yields of polymer.

The olefin charging stocks can be polymerized in the gas phase and in the absence of a liquid reaction medium by contact with the claimed metal hydride and group 6a metal oxide catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is desirable to effect the conversion of the olefin in the presence of suitable liquid reaction media. The liquid reaction medium may also be employed as a means of contacting the olefin catalyst by preparing a solution of the olefin feed stock in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition we may employ such aromatic hydrocarbons as ethylbenzene, isopropyl-benzene, n-propylbenzene, sec-butylbenzene, t-butylbenzene, ethyltoluene, ethylxylenes, hemimellitene, psuedocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexanes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of $MoO_3$—$Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

When solvents such as xylenes are employed, some slight alkylation thereof by ethylene can occur under the reaction conditions. Propylene is a far more reactive alkylating agent than ethylene and when propylene is present in the feed, it is desirable to employ a non-alkylatable solvent such as decalin. The alkylate is removed with grease in the present process, can be separated therefrom by fractional distillation and can, if desired, be returned to the polymerization zone.

An illustrative flow diagram indicating one method by which the process of our invention may be effected is set forth in the accompanying figure. The olefinic charging stock, e. g., ethylene or an ethylenepropylene mixture, is passed through compressor 10 wherein the pressure thereof is raised to a suitable value, for example, between about 500 and 2000 pounds, thence into chamber 11, which is provided with a suitable deoxygenating agent such as metallic copper at 150° C., then into chamber 12 which is provided with a dehydrating agent such as adsorptive alumina, anhydrous calcium sulfate, silica gel or equivalent drying reagent. The dried charging stock is passed from chamber 12 into chamber 13 wherein carbon dioxide is removed from the charging stock. Chamber 13 is provided with a suitable reagent, for example, sodium hydroxide deposited upon asbestos or with any other efficacious decarbonating reagent. The charging stock may be dried further if necessary after leaving chamber 13. The charging stock thus purified usually contains less than 50 parts per million of oxygen and has a dew point below —45° C. The purified charging stock is then passed into an absorber 14, wherein it meets a counterflow of solvent. Solvent or liquid reaction medium may be charged to the absorber and to the process by pump 15 through valved line 16 and heat exchanger 17, wherein it is brought to a suitable temperature for absorption, usually between about 15 and about 35° C.; recycle solvent from line 61 may also be charged to the absorber or may be the sole absorption medium employed. In absorber 14 a solution containing between about 2 and about 30 percent olefin is produced and is withdrawn through valved line 18 into a guard chamber 19 for final purification. The guard chamber may contain an active metal or metal hydride, for example, sodium or other alkali metal, an alkaline earth metal, an alkali metal hydride or an alkaline earth metal hydride. The guard chamber may preferably be filled with calcium hydride. The guard chamber may be operated at temperature between about 100 and about 280° C. If the feed stock is of sufficient purity, the guard chamber may be by-passed (by lines not shown) and introduced directly into reactor 25.

From guard chamber 19 the ethylene and solvent are discharged into line 20, thence through pump 21 into heater 22 wherein they are brought to the polymerization temperature, for example, between about 200 and about 275° C. From heater 22 the charge is passed through line 23, thence through line 24 into the lower end of reaction chamber 25. While a variety of suitable reactors can be employed, in the accompanying figure there is illustrated an autoclave divided into upper and lower sections by baffle 26. A stirring mechanism 27 projects into the lower portion of the reactor and suitable baffles 28 are provided at the walls. The stirring mechanism may be operated at about 20 to about 1000 R. P. M., e. g., about 650 R. P. M. It will be apparent, therefore, that a high degree of intermixing between the catalyst, metal hydride, olefinic material and liquid reaction medium is achieved in the lower portion of reactor 25. Reactor 25 may be initially charged with the group 6a metal oxide catalyst and metal hydride through lock hopper devices are equivalents, and further amounts of metal oxide catalyst and metal hydride can be added intermittently during the course of the reaction, as desired, by suitable means.

If desired, a portion of the predried solvent can be passed through valved line 29 and heater 30, wherein it is brought to a temperature between about 150 and about 300° C., into a contacting chamber 31 provided with baffle 32, stirring mechanism 33 and an inlet 24 for metal hydride. An intimate dispersion of metal hydride in solvent is formed in contactor 31 and is withdrawn from the upper quiescent zone of contactor 31 through valved line 35 into line 24, and is forced by pump 36 into reactor 25. An alternative and very useful method of purifying the solvent in contacting chamber 31 is to treat said solvent with an alkali metal hydride, usually NaH, and a supported group 6a metal oxide, e. g. 10 weight percent $MoO_3$-gamma alumina, using about 3 to about 10 parts by weight of supported metal oxide per part by weight of alkali metal hydride, at a temperature between about 135 and about 270° C. and liquid hourly space velocities between about 0.5 and about 10.

In reactor 25, the polymerization of ethylene or propylene, or copolymerization of ethylene with other polymeric materials, is effected at suitable temperatures and pressures. The usual concentration of ethylene in the solvent entering the reactor is about 10 weight percent and the effluent from the reactor is usually a 2–5 weight percent solution of solid polymer in the solvent. When the preparation of a homopolymer of ethylene having a Staudinger specific viscosity ($\times 10^5$) of about 15,000 to 30,000, melt viscosity of $2 \times 10^5$ to about $5 \times 10^6$ poises is desired, the preferred temperatures are between about 230° C. and about 275° C. The reaction period can be varied between about 10 and about 100 minutes.

It will be understood that instead of one reactor we may employ a number of reactors in parallel or in series. When reactors are employed in series, variations in temperature and pressure, olefin concentration in solvent, and catalyst concentration become possible so that more control can be exerted over the average molecular weight and molecular weight range of the product, as well as of the extent of conversion in each stage. Also, through the employment of a number of manifolded reactors, suitable by-pass lines and valves, it becomes possible to cut any reactor out of the system for purposes of cleaning and repair.

The upper portion of reactor 25 constitutes a quiescent settling zone wherein fine catalyst particles and metal hydride settle from the solution of polymer product in the reaction solvent and return under the force of gravity to the lower agitated portion of the reactor. The relatively clear solution of reaction products in solvent is withdrawn from the upper portion of reactor 25 through line 37 and expansion valve 38, wherein the pressure is allowed to fall to a value between about 15 and about 250 p. s. i. g. The product mixture discharged from valve 38 tangentially into a separator, e. g., a cyclone-type separator 39 wherein a temperature of at least about 150° C. is maintained. Gas comprising a substantial proportion of ethylene in a poison-free condition is discharged from separator 39 through valved line 40. Hot solvent may be introduced into separator 39 through line 51 in order to prevent separation of polymer upon the walls of the separator. The solution of polymer in solvent is withdrawn from separator 39 through valved line 41, into filter 42, wherein any fine catalyst particles which may have been carried along, are separated and withdrawn through valved line 43. If desired, the polymer solution may be subjected to the action of ultrasonic vibrators, which effect coagulation of the very fine catalyst particles so that they can be more readily filtered.

The solution of polymer product is withdrawn from filter 42 through line 44 into cooler 45, wherein its temperature is adjusted to a value between about 20 and about 90° C. and is then discharged through line 46 into filter 47. The solid polymer product is removed from filter 47 at 48 and the solvent or reaction medium is withdrawn through line 49, whence a portion can be discharged from the system through valved line 50, a portion can be passed through valved line 51, pump 52 and heater 53 into separator 39, and the remainder can be passed through valved line 54 into fractionator 55.

Precipitation of the polymer from the solution in line 44 can be induced by the addition of antisolvents such as propane, alcohols, ketones (acetone), etc. The polymeric product of the present process removed at 48 can be subjected to various treatments to prepare it for conversion to a finished industrial product. Thus, it may be subjected to various treatments to remove the imbibed solvent, it may be shredded or extruded to form string-like particles, dried, etc.

In fractionator 55, the solvent or liquid reaction medium is vaporized and passes overhead through line 56, whence a portion may be removed from the system through valved line 57, but is preferably passed through valved line 58 into cooler 59, wherein its temperature is brought to a value between about 20° C. and about 80° C., whence it is passed into pump 60. Pump 60 forces the solvent through valved line 61 and heat exchanger 17 into absorber 14 to prepare a solution of fresh olefin charging stock for the polymerization process. A portion of the solvent is also forced by pump 60 through valved line 62 into the upper portion of absorber 63. Recycled gases from separator 39 and line 40 are passed through valved line 64 and compressor 65 through line 66 into the lower portion of absorber 63, in which olefin is selectively absorbed in the solvent to produce a solution having a concentration between about 2 and about 10 weight percent of ethylene, which is discharged from absorber 63 through valved line 67 into line 20, whence it is passed to reactor 25. Unabsorbed gases are discharged from absorber 63 through valved line 68.

Liquid reaction products boiling above the boiling range of the solvent medium can be discharged from fractionator 55 and the process through valved line 69 but are preferably passed through valved line 70 into a second fractionator 71. A by-product of the present polymerization process produced in relatively small volume when an alkylatable aromatic hydrocarbon solvent such as a xylene is employed, is an alkylate formed by reaction of said alkylatable aromatic hydrocarbon and ethylene (or propylene, when it is employed as a component of the charging stock). The alkylated aromatic hydrocarbon products are vaporized and fractionated in tower 71, from which they are discharged through line 72. It is usually desirable to recycle at least a portion of the alkylate through valved line 73 to line 41 for employment as a diluent and solvent in filter 42. The remainder of the alkylate may be discharged from the process through valved line 74 or may be recycled for employment as part of the liquid reaction medium in reactor 25.

Relatively small proportions of low molecular weight grease-like olefin polymers are produced in the polymerization process. The grease-like products are removed as a bottoms fraction from tower 71 through valved line 75.

An alternative method of operation following filtration of fine catalyst particles in filter 42 involves introduction of the dilute solution of ethylene or other olefin polymers in the reaction solvent, e. g., benzene, into a tower containing hot water or a mixture of liquid water and steam at a temperature sufficient to flash distil the solvent (or an azeotrope of solvent and water) from the solution and to produce a water slurry of the solid polymer containing about 1 to about 5 weight percent polymer. The aqueous slurry of polymer can be concentrated by conventional methods to yield a slurry containing about 10 to 15 weight percent polymer, which can thereafter be centrifuged to yield a polymer containing a minor proportion of water, which can be thoroughly dried in conventional equipment. The solvent passing overhead in the flash distillation operation can be condensed, separated from a lower liquid layer of water, redistilled to further dry it and finally can be thoroughly dried with desiccants, e. g. silica gel or alumina gel, prior to recycle to storage or to the polymerization reaction zone.

The following examples are presented for the purpose of illustrating but not unduly limiting the claimed invention. Unless otherwise indicated, the general procedure which was employed in batch operations was as follows. The catalyst was 20–85 mesh, 8 w.% $MoO_3$ supported on gamma-alumina. The molybdena catalyst was calcined before the use unless otherwise indicated and pre-reduced in the examples indicated in the table. Pre-reduction of the molybdena catalyst was carried out with dry hydrogen passing at atmospheric pressure through the catalyst at approximately 5 liters per hour per 1–10 g. of catalyst for 16 hours at 480° C. The reactions were carried out in a pressure vessel having a capacity of 100 ml. or 250 ml., depending upon whether 50 ml. of solvent or more solvent was employed. The reactors were provided with a magnetically operated stirring mechanism. The reactor was charged with solvent and thereafter with the molybdena catalyst. The gas space in the reactor was then blanketed with nitrogen. The metal hydride in powdered form was then added to the reaction vessel, whereupon the head was fitted while maintaining a flow of nitrogen to keep the system free of air. When unreduced catalyst was charged to the reaction vessel, it was simply poured in without the use of nitrogen. Residual air was flushed from the reaction vessel while pressure testing with hydrogen. The final component, ethylene, was charged to the reaction vessel after the latter had been heated to the reaction temperature. The magnetically driven stirrup-type stirrer was alternately lifted and plunged down through the solution at a rate sufficient to keep the catalyst in suspension. The olefin feed was introduced from time to time during the course of the run in order to maintain the reaction pressure. A minor hydrogen partial pressure of the order of about 100–200 p. s. i. g. may be superimposed on the olefin pressure when the reaction fails to start readily. By plotting cumulative pressure drop against cumulative time, the progress of a run can be followed. In many cases much higher yields might have been obtained, had provision been made for the inclusion of a larger proportion of solvent in the reaction zone, since one of the reasons for run termination was jamming of the stirring mechanism due to the fact that the high molecular weight polymer was produced in the reaction zone in an amount exceeding its solubility in the liquid reaction medium under the reaction conditions.

Although the significance of the tabulated results is believed to be self-evident, some commentary is furnished hereinafter to point out various inter-relationships between the various examples, etc.

The important effects of our alkali metal hydride promoters will be appreciated by bearing the following information in mind. In runs carried out without promoters, employing the general operating procedure above described, employing 8 w. per cent pre-reduced molybdena-gamma-alumina catalyst and a C. P. xylenes:catalyst ratio (ml./g.) of 5, only 0.5 g. per g. of catalyst of solid ethylene polymer were obtained at 230° C. and 1000 p. s. i. g. initial ethylene pressure, ethylene being repressured into the reactor until no further amount could be absorbed. Alkali metal hydride promoters permit the employment of very high solvent:catalyst ratios while maintaining relatively high polymerization rates, which in turn permits continuous processing and long catalyst life and also results in the production of much higher solid polyethylene yields per weight of metal oxide catalyst which is employed.

The table shows that a considerable variety of solvent:catalyst ratios (ml./g.) may be employed. In a number of Examples (12, 13, 16, 17 and 18), the relatively low solvent:catalyst ratio of 25 was employed. A highly purified solvent was employed in Example 9, wherein the solvent:catalyst ratio can be 150 or even more. In Example 9, the xylenes solvent was purified by refluxing 1000 cc. of C. P. xylene with 20 g. of an 8 w. per cent $MoO_3$-gamma-alumina catalyst and 3 g. of lithium aluminum hydride at 135° C. for 18 hours and then filtering the xylenes. When the highly purified xylenes solvent was employed, a high yield of solid ethylene polymer of high molecular weight was obtained. Very good results were also obtained in Example 11, wherein the solvent:catalyst ratio was 350.

The alkali metal hydrides are apparently active reducing agents under the conditions of our process, since calcined catalysts can be employed without pre-reduction. Thus, it will be observed from Example 14 that pre-reduction of the catalyst did not markedly change the character of our polymerization process.

It will be noted from the tabulation that various weight ratios of metal hydride to oxide catalyst have been successfully employed. In Example 31 the weight ratio was 0.05. In Example 34 the weight ratio was 0.125 and in Example 35 the weight ratio was 0.1. It will be noted from the table that usually we employ a 0.2 weight ratio of sodium hydride to molybdena catalyst.

In Example 36, the metal hydride promoter was lithium hydride.

In Examples 1 and 12, respectively, small proportions of oxides of nickel and boron were added as third components to the molybdena catalysts.

Although purified xylenes was employed as the solvent and liquid reaction medium in most of the examples, benzene has been employed successfully in Example 8 and in Example 37; decalin was employed in ethylene polymerization in Example 33 and in many examples wherein both ethylene and propylene were employed as charging stocks (17–26, 28, 35).

Although the reaction temperature of 230° C. or thereabouts was usually employed for the polymerization of ethylene in the presence of sodium hydride and molybdena-alumina catalysts, lower and higher temperatures may be employed. Thus, in Example 33, the much lower temperature of 155° C. was successfully employed although, as might be expected, the reaction rate was somewhat reduced.

Examples 4, 7, 9, 10, 11, 31, 32 and 37 merit attention because commercially attractive yields of solid polyethylene were produced. The term "yields" in the preceding sentence should be qualified, since in many instances experiments were arbitrarily halted and in other instances the reaction bomb became full of polymer and caused the stirring mechanism to jam, necessitating termination of the operation. It will be obvious then that much higher yields may be expected in equipment designed for commercial operation.

Ethylene was successfully co-polymerized with propylene in a number of examples, as in Examples 17–20, wherein the ratio of ethylene to propylene was varied. In general, we have observed that increasing the propylene concentration in the olefinic charging stock tends to lower the overall reaction rate and to yield a polymer of decreasing density.

TABLE

| Example | Catalyst, g.[1] | NaH, g. | Temp., °C. | Pressure, p.s.i.g. | Solvent, ml.[2] | Yield of Solid Polymer, g./g. of Oxide Catalyst | $10^2 \times$ Specific Viscosity[3] | Melt Viscosity, Poises[4] | Film[5] | $10^4 \times$ Density of Solid Polymer | Remarks |
|---|---|---|---|---|---|---|---|---|---|---|---|
| 1 | 1.0 | 0.2 | 230 | 1,165 | 50X | 4.14 | 9.5 | [4] 1.8 | B | | |
| 2 | 1.0 | 0.2 | 230 | 1,150 | 50X | 2.17 | 49.7 | [7] 1.23 | TF | | Percent NiO in catalyst very low. |
| 3 | 1.0 | 0.2 | 230 | 1,125 | 50X | 0.1 | | | | | Catalyst was 9 w. $MoO_3$ on $Al_2O_3$ containing 8 w. MgO. |
| 4 | 1.0 | 0.2 | 230 | 1,160 | 50X | 7.7 | 47.6 | [5] 4.8 | TF | | |
| 5 | 1.0 | 0.2 | 230 | 200/1,190 | 150X | 2.06 | 22.6 | [6] 3.4 | TF | | |
| 6 | 3 | 0.6 | 230 | 1,090 | 150X | 3.4 | 25.2 | [6] 1.9 | | | |
| 7 | 1 | 0.2 | 230 | 1,115 | 150X | 9.7 | 65.6 | [7] 3.5 | | | The xylene was pretreated with 3 g. 8 w. percent $MoO_3$–$Al_2O_3$+0.6 g. NaH at 230° C./1 hr. |
| 8 | 0.5 | 0.1 | 230 | 1,100 | 150B | 1.9 | 12.5 | 54 | B | | Benzene was treated with $AlCl_3$, distilled, and treated with $SiO_2$ gel. |
| 9 | 0.93 | 0.19 | 230 | 1,110 | 140X | 11.2 | Ins. (Ca. 70) | [7] 5.8 | | | |
| 10 | 0.93 | 0.19 | 230 | 1,100 | 140X | 6.9 | 23.8 | [6] 3.3 | | | Xylenes treated with $AlCl_3$–HCl; NaH; $H_2O$-washed; contacted with $SiO_2$ gel. Very pure xylene. |
| 11 | 0.4 | 0.08 | | | 140X | 6.75 | 21.9 | [6] 8 | TF | | |
| 12 | 2 | 0.4 | 232 | 950 | 50X | 1.31 | Ins. | [7] 2.3 | TF | | Catalyst was 9 w. percent $MoO_3$ on $Al_2O_3$ containing 4 w. percent $B_2O_3$. |
| 13 | 2 | 0.4 | 235 | 950 | 50X | 1.33 | 17.5 | | TF | | Catalyst was 9 w. percent $MoO_3$ on $Al_2O_3$ containing 4 w. percent $SiO_2$. |
| 14 | 1 | 0.2 | 234 | 950 | 50X | 4.06 | 51.9 | [7] 2.6 | TF | | Heated a while at reaction temp. before ethylene addition. Catalyst pre-reduced with $H_2$ at 480° C. for 14 hours. |
| 15 | 1 | 0.2 | 234 | 970 | 50X | 1.66 | 42.6 | [7] 1.7–[6] 3.7 | TF | | Compare Example 14. |
| 16 | 1 | 0.2 | 232 | 920 | 25X | 2.86 | 37.3 | [5] 3.8 | TF | | 5% t-butylethylene added. |
| 17 | 2 | 0.4 | 233 | 700 $C_2$ / 350 $C_3$ | 50D | 0.94 | 26.6 | | TF | | $CH_2/CH_3=10$. (The grease was a soft, rubbery solid which was good for V. I.) |
| 18 | 2 | 0.4 | 233 | 800 $C_2$ / 200 $C_3$ | 50D | 3.0 | 37.5 | [6] 4.2 | TF | 9,200 | |
| 19 | 2 | 0.4 | 232 | 150 $C_2$ / 600 $C_3$ | 50D | 0.3 | 14 | | TF | | |
| 20 | 2 | 0.4 | 234 | 750 $C_2$ / 250 $C_3$ | 50D | 1.33 | 18.7 | [5] 3.1 | TF | | $CH_2/CH_3=8.3$. |
| 21 | 2 | 0.4 | 233 | 940 | 25X | 1.10 | 32.9 | [6] 1.9 | TF | | 20% t-butylethylene added. |
| 22 | 2 | 0.4 | 200 | 800 $C_2$ / 200 $C_3$ | 50D | 1.34 | 21.4 | | TF | 9,220 | $CH_2/CH_3=8.6$. |
| 23 | 2 | 0.4 | 232 | 800 $C_2$ / 200 $C_3$ | 150D | 4.4 | 13.3 | [5] 4.8 | Sl.TF | 9,421 | $CH_2/CH_3=13$. |
| 24 | 0.5 | 0.1 | 232 | 800 $C_2$ / 200 $C_3$ | 150D | 3.26 | 12.3 | | B | 9,829 | $CH_2/CH_3=16$. |
| 25 | 2 | 0.4 | 232 | 800 $C_2$ / 100 $C_3$ | 150D | 4.47 | 17 | | TF | 9,394 | |
| 26 | 2 | 0.4 | 152 | 500 $C_2$ / 500 $C_3$ | 50D | 0.78 | 42.4 | | TF | 8,926 | $CH_2/CH_3=13$. Catalyst was heated to 230° C. before test. |
| 27 | 3 | 0.6 | 232 | 1,100 | 150X | 2.73 | 25–41.9 | [6] 5.5 / [7] 1.14 | TF | | Batch — continuous — 9 cycles. |
| 28 | 2 | 0.4 | 198 | 800 $C_2$ / 200 $C_3$ | 150D | | | | | | See text below for yields and product quality. |
| 29 | 3 | 0.6 | 150 | 500/800 | 50D | 0.25 | 16.3 | | | | Propylene alone. Catalyst was preheated to 230° C. Polymer was soft, stretchy, elastic. |
| 30 | 3 | 0.6 | 230 | 1,000 | 160X | 1.32 | 17.4–41.3 | | TF | | Batch — continuous runs —13 cycles. |
| 31 | 1 | 0.05 | 234 | 1,100 | 50X | 5.86 | 56.8 | [7] 1.4 | TF | 9,637 | Pre-reduced with $H_2$. |
| 32 | 0.5 | 0.05 | 233 | 1,100 | 50X | 7.52 | 66.4 | [7] 2.2 | TF | 9,573 | Do. |
| 33 | 3 | 0.6 | 230 (½ hr.) 155 (270 min.) | 1,070 | 50D | 1.57 | 34.4 | [7] 1.2 | TF | 9,712 | Low temperature. |
| 34 | 8 | 1.0 | 230 | 1,000 | 75X | 2.16 | 7.3–45.9 | [6] 0.12 / [6] 7 | TF | 9,727 / 9,853 | Batch — continuous run —14 cycles. |
| 35 | 10 | 1.0 | 230 | 1,000 | 50D | 1.0 | 7.6–58.3 | [6] .12 / [6] 14.7 | TF | | Batch—continuous run —13 cycles. Feed was 88% $C_2=+1.1\%$ $C_3=$. |
| 36 | 0.5 | 0.1 (LiH) | 227 | 890 | 50X | 1.5 | 15.8 | | B | 9,802 | |

[1] 8 w. percent $MoO_3$-gamma-alumina.
[2] X represents xylenes; B represents benzene; D represents decalin.
[3] The specific viscosity is (relative viscosity −1) and relative viscosity is the ratio of the time of efflux of a solution of 0.125 g. polymer in 100 cc. C. P. xylenes at 110° C. from the viscosimeter as compared with the time of efflux of 100 cc. C. P. xylenes at 110° C.
[4] As determined by the method of Dienes and Klemm, J. Appl. Phys. 17, 458-71 (1946). The superscript refers to the exponent of 10 times the number given.
[5] T means tough; F means flexible; Sl means slightly.

Example 26 is an instance of ethylene-propylene polymerization at the relatively low temperature of 152° C. and Example 28 was operated at about 200° C. In the latter example, the solid polymer was heated in 1000 cc. of decalin to the boiling point of the solvent and the solution was cooled to 40° C. and filtered. The filtrate contained 3.4 g. of solid polymer per g. of catalyst and was characterized by a specific viscosity (10⁵) of 9,200, melt viscosity of 2.35×10³ poises and density of 0.945. The polymer, which was insoluble in the decalin, was formed in the yield of 1.7 g. per g. of catalyst and was characterized by a specific viscosity (10⁵) of 18,100, melt viscosity of 6.4×10⁵ poises and density of 0.908; this polymer was molded to a tough and flexible film. Attention is directed to the commercially attractive yields of solid polymer from ethylene-propylene in Examples 23, 24 and 25.

Ethylene was successfully polymerized in the presence of t-butylethylene (5% and 20%) in Examples 16 and 21.

Propylene was polymerized alone in Example 29. It will be noted that the rate of propylene polymerization is much lower under comparable conditions than the rate of ethylene polymerization.

Although most of the examples were performed by batch procedure, several of the examples are based on batch-continuous procedures in which, from time to time, a solution of solid polymeric product in the reaction medium is withdrawn from the reaction autoclave and is replaced by a solution of fresh olefin charging stock in the liquid reaction medium, each such operation constituting one cycle. In Example 27 polymerization was continued throughout a period of 9 cycles; Example 30, 13 cycles; Example 34, 14 cycles; Example 35, 13 cycles, the charging stock being a mixture of ethylene and propylene.

Our invention has also been practiced successfully in continuous flow operations employing a stainless steel autoclave provided with a mechanical stirrer and having the capacity of one liter. The design of the autoclave is substantially as shown in the accompanying figure.

*Example 37*

In the flow operation of the following example the catalyst was 53 g. of 8 w.% molybdena on gamma-alumina, pre-reduced with hydrogen at 480° C. and atmospheric pressure for 16 hours before use and 2.5 g. NaH. The charging stock was a solution of 9 w.% ethylene in benzene, which was passed through a guard reactor containing 76 g. CaH₂ at 204° C., thence into the reaction autoclave wherein it was subjected to a temperature of 243° C. and total pressure of 1700 p. s. i. g. The flow rate of solution through the reactor was 860 g. per hour and the total on-stream period was 20.75 hours. The yield of ethylene polymer in this operation was 6.68 g. per g. of molybdena catalyst and the weight percent ethylene conversion was 32.4. The operation yielded 354.2 g. of solid polymer having a melt viscosity of 1.9×10⁶ poises.

In the two following examples of continuous flow operations, the catalyst employed was 20–80 mesh of 7.5 w.% molybdena on gamma-alumina which had been air-blown to remove fines and then calcined at 1200° F. for 8 hours. The catalyst was activated by hydrogen pre-reduction at 480° to 530° C. and was stored under hydrogen in sealed vessels before use. The xylenes solvent was purified by contacting with 100 g. of the above-mentioned catalyst and 15 g. NaH at the rate of 2 liters per hour at 230° C., following which the solvent was redistilled. The ethylene employed was dehydrated with anhydrous calcium sulfate and decarbonated by treatment with sodium hydroxide deposited on asbestos.

*Example 38*

A 10 w.% solution of the purified ethylene and the purified xylene solvent was contacted with 48 g. of the molybdena catalyst and 2.5 g. of sodium hydride at 243° C. and 1000 p. s. i. g. The period of contacting was 60 hours over the course of which 2450 g. of ethylene had been contacted with the catalyst. The operation yielded 566.7 g. of solid ethylene polymer which was insoluble in the xylenes solvent at room temperature, 13.2 g. of a grease-like ethylene polymer and 7.0 g. of xylenes alkylate. Approximately 97% of the ethylene converted yielded solid polymer having a melt viscosity of about 7×10⁶ poises.

*Example 39*

In a parallel run, 94 g. of molybdena catalyst were employed together with 4.7 g. NaH at 252° C. and reactor pressure of 1000 p. s. i. g. A 10 w. percent solution of ethylene in purified xylenes was charged into the reactor. The on-stream period was 88.5 hours during which time 6017 g. ethylene were contacted with catalyst and the reaction yielded 964 g. of solid ethylene polymer insoluble in the xylenes solvent at room temperature, 33 g. of a grease-like ethylene polymer and 14.4 g. of xylenes alkylate. The conversion of ethylene was 21 w. percent, of which 95 w. percent was consumed in the production of solid polymer. Some properties of the solid polyethylene produced in this example are tabulated below.

ASTM TEST D 882, 20 MIL COMPRESSION MOLDED SHEET

| Temp., ° C. | Yield Stress, p. s. i. | Elongation at Yield, Percent | Elongation at Break, Percent | Initial Modulus, p. s. i. | Testing Speed, in./min. |
|---|---|---|---|---|---|
| −21 | 6,140 | 11.9 | 300 | 1.30×10⁴ | 2 |
| +23 | 3,230 | 14.8 | 590 | 7.20×10⁴ | 2 |
| +59 | 2,025 | ¹ 15.7 | >700 | 3.68×10⁴ | 2 |

¹ 10% offset.

ASTM TEST D 638, INJECTION MOLDED BARS

| Yield Stress, p. s. i. | Elongation at Yield, Percent | Elongation at Break, Percent | Initial Modulus, p. s. i. |
|---|---|---|---|
| 4,265 | 19.7 | 58.6 | 13.6×10⁴ |

MISCELLANEOUS PHYSICAL PROPERTIES

| Impact Strength, Ft.-Lb./in. of Notch | | Brittleness Temp., ° C. | Dielectric Constant | Power Factor at 1mc |
|---|---|---|---|---|
| −40° C. | 23° C. | | | |
| >16 | >16 | <−70 | 2.30 | 0.00043 |

It was found that the product could be successfully molded into mechanically strong pieces.

We may employ group 5a metal oxide catalysts in lieu of group 6a metal oxides in our process, viz., oxides of vanadium, columbium and tantalum, the process remaining otherwise unchanged in all essential regards.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity$\times 10^5$ of about 50,000 in about one liter of xylenes at a temperature close to the boiling point produced an extremely viscous solution.

The polymers produced by the present process can be subjected to chemical modifying treatments, such as halogenation, halogenation followed by dehalogenation, sulfohalogenation by treatment with sulfuryl chloride, sulfonation, and other reactions to which hydrocarbons may be subjected.

Having thus described our invention, what we claim is:

1. In a process for the production of a normally solid hydrocarbon material, the steps which comprise contacting a normally gaseous olefin containing 2 to 3 carbon atoms, inclusive, in the molecule with an alkali metal hydride and an oxide of a metal of group 6a of the Mendeleef Periodic Table at a reaction temperature between about 75° C. and about 325° C., and separating a normally solid hydrocarbon material thus produced.

2. The process of claim 1 which is effected in the presence of a liquid hydrocarbon reaction medium.

3. In a process for the production of a normally solid hydrocarbon material, the steps of contacting ethylene with an alkali metal hydride and an oxide of a metal of group 6a of the Mendeleef Periodic Table at a reaction temperature between about 75° C. and about 325° C. and separating the normally solid hydrocarbon material thus produced.

4. The process of claim 3 wherein said oxide is partially pre-reduced before use.

5. The process of claim 3 which comprises introducing a minor proportion of hydrogen based upon said ethylene, before substantial polymerization of said ethylene has been effected, in order to initiate rapid and substantial polymerization of said ethylene.

6. A process for the preparation of a normally solid polymer which process comprises contacting ethylene with an alkali metal hydride and a catalyst comprising essentially molybdenum oxide having an average valence state between about 2 and about 5.5 at a reaction temperature between about 75° C. and about 325° C., and separating the normally solid polymer thus produced.

7. In a process for the production of a normally solid, resinous hydrocarbon material, the steps which comprise contacting ethylene with an alkali metal hydride and an oxide of a metal of group 6a of the Mendeleef Periodic Table in the presence of a liquid hydrocarbon reaction medium at a reaction temperature between about 75° C. and about 325° C., and separating a normally solid, resinous hydrocarbon material thus produced.

8. The process of claim 7 wherein said oxide is partially pre-reduced before use.

9. The process of claim 7 wherein said liquid hydrocarbon reaction medium is a saturated hydrocarbon.

10. The process of claim 7 wherein said liquid hydrocarbon reaction medium is a monocyclic aromatic hydrocarbon.

11. In a process for the production of a normally solid, resinous hydrocarbon material, the steps which comprise contacting ethylene with an alkali metal hydride and an oxide of a metal selected from the group consisting of chromium, molybdenum and tungsten in the presence of a liquid hydrocarbon reaction medium at a reaction temperature between about 75° C. and about 325° C., and separating a normally solid, resinous hydrocarbon material thus produced.

12. In a process for the production of a normally solid, resinous hydrocarbon material, the steps which comprise contacting ethylene in a concentration between about 2 weight percent and about 10 weight percent in a liquid hydrocarbon reaction medium with an alkali metal hydride and an oxide of a metal of group 6a of the Mendeleef Periodic Table at a reaction temperature between about 130° C. and about 260° C. and a reaction pressure of at least about 200 p. s. i. g., and separating a normally solid, resinous hydrocarbon material thus produced.

13. The process of claim 12 wherein the weight ratio of said alkali metal hydride to said oxide is between about 0.001 and about 2.

14. The process of claim 13 wherein said alkali metal hydride is NaH and said oxide is molybdena.

15. In a process for the production of a normally solid, resinous hydrocarbon material, the steps which comprise contacting ethylene in a concentration between about 2 weight percent and about 10 weight percent in a liquid hydrocarbon reaction medium with an alkali metal hydride and a minor proportion of an oxide of a metal selected from the group consisting of chromium, molybdenum and tungsten supported upon a major proportion of a difficultly reducible metal oxide, the ratio of said alkali metal to metal oxide catalyst being between about 0.01 and about 0.25 by weight, at a temperature between about 130° C. and about 260° C. and a pressure between about 200 and about 5000 p. s. i. g., and separating a normally solid, resinous hydrocarbon material thus produced.

16. The process of claim 15 wherein the alkali metal is sodium hydride, the liquid reaction medium is xylenes and the metal oxide is a molybdenum oxide supported by gamma-alumina.

17. The process of claim 15 wherein the alkali metal is lithium hydride, the liquid reaction medium is xylenes and the metal oxide is a molybdenum oxide supported by gamma-alumina.

18. A process for the preparation of a tough, resinous, normally solid polymer, which process comprises contacting ethylene in a concentration of at least about 2 weight percent but not more than about 10 weight percent in a liquid hydrocarbon reaction medium with sodium hydride and a catalyst comprising a major proportion of a difficultly reducible metal oxide and a minor proportion of a partially pre-reduced molybdenum oxide having an average valence state between about 2 and about 5.5 at a temperature between about 130° C. and about 260° C. and a pressure between about 200 and about 5000 p. s. i. g., and separating a solid polymer thus produced.

19. The process of claim 18 wherein said liquid hydrocarbon reaction medium is xylenes, said molybdenum oxide is supported upon gamma-alumina and the sodium hydride:molybdena catalyst ratio is between about 0.01 and about 0.25, by weight.

20. In a process for the production of a normally solid hydrocarbon material, the steps of contacting propylene with an alkali metal hydride and an oxide of a metal of group 6a of the Mendeleef Periodic Table at a reaction temperature between about 75° C. and about 325° C. and separating the normally solid hydrocarbon material thus produced.

21. A process for the preparation of a normally solid hydrocarbon material, which process comprises contacting propylene with a liquid hydrocarbon reaction medium, an alkali metal hydride and a catalyst comprising a minor proportion of an oxide of molybdenum supported upon a major proportion of a difficultly reducible metal oxide at an effective temperature between about 75° C. and about 325° C., and separating the normally solid hydrocarbon material thus produced.

22. A process for the preparation of a resinous copolymer from ethylene and propylene, which process comprises contacting ethylene and propylene with a liquid hydrocarbon reaction medium, an alkali metal hydride and a catalyst comprising a major proportion of a difficultly reducible metal oxide and a minor proportion of a molybdenum oxide catalyst at a temperature between about 75° C. and about 325° C. and a pressure of at least about 200 p. s. i. g., and separating a normally solid polymerization product thus produced.

23. A process for the preparation of a tough, resinous, hydrocarbonaceous material from ethylene and propylene, which process comprises contacting ethylene and propylene with decalin, sodium hydride, a gamma-alumina supported molybdena, the weight ratio of said sodium hydride to said supported molybdena being between about 0.001 and about 2 at a temperature between about 75° C. and about 325° C. and a pressure of at least about 200 p. s. i. g., and separating a tough, resinous, hydrocarbonaceous material thus produced.

References Cited in the file of this patent

UNITED STATES PATENTS 2,385,609    Clark  ------------------  Sept. 25, 1945